United States Patent [19]

Buchheit

[11] Patent Number: 4,487,540
[45] Date of Patent: Dec. 11, 1984

[54] STACKING MACHINE FOR ROLLED BAR SHAPES

[75] Inventor: Otto K. Buchheit, Ingbert, Fed. Rep. of Germany

[73] Assignee: Mannesmann Aktiengesellschaft, Duesseldorf, Fed. Rep. of Germany

[21] Appl. No.: 433,465

[22] Filed: Oct. 12, 1982

[30] Foreign Application Priority Data

Oct. 20, 1981 [DE] Fed. Rep. of Germany ....... 3141476

[51] Int. Cl.³ .............................................. B65G 57/18
[52] U.S. Cl. .................................... 414/30; 198/374; 198/419; 198/442; 414/56; 414/74
[58] Field of Search .......................... 414/30, 56, 74; 198/374, 419, 420, 442

[56] References Cited

U.S. PATENT DOCUMENTS 3,347,397 10/1967 Hein .................................. 414/30 X
4,278,377 7/1981 Elineau ................................ 414/30

FOREIGN PATENT DOCUMENTS 30753 8/1964 Fed. Rep. of Germany .
1235811 3/1967 Fed. Rep. of Germany ........ 414/30
1932692 1/1971 Fed. Rep. of Germany .
122501 3/1975 Fed. Rep. of Germany .
2092091 8/1982 United Kingdom ................ 198/419

Primary Examiner—Leslie J. Paperner
Attorney, Agent, or Firm—Schwartz, Jeffery, Schwaab, Mack, Blumenthal & Koch

[57] ABSTRACT

A feed roller table with rollers (11a) is divided into partial widths (A and B). The rolled shapes to be stacked are passed onto the feed table in layers of different numbers of bars n and n−1 and are braked during bar movement by elevation of braking skids (38 and 41). The skids of one series of braking skids (41) are designed to function as turnover magnets and may be rotated 180° to a position above another series of skids (38) in order that de-energization of the turnover magnet braking skids (41) will permit an interlocked layer of rolled shapes to be formed on the other braking skids (38). This double layer of bars is picked up by horizontally shiftable receiving magnets (43) and deposited on stacking table arms (49) which index downward into a position (49') below the level of the stacking roller table for rotation through 90° to pass horizontally underneath the stack of bars exiting on the roller table and to return to the upper receiving position.

Due to the fact that the diametrically opposed braking skids (38 and 41) may be rotated into a vertical position in which they are lowered between the partial widths A and B to a point underneath the table rollers (11a) to move back into the diametrical horizontal position without intersecting the level of the roller table, a new appropriately separated layer of bars may enter the stacking machine while the succeeding bars are still being braked on the braking skids (38 and 41).

2 Claims, 12 Drawing Figures

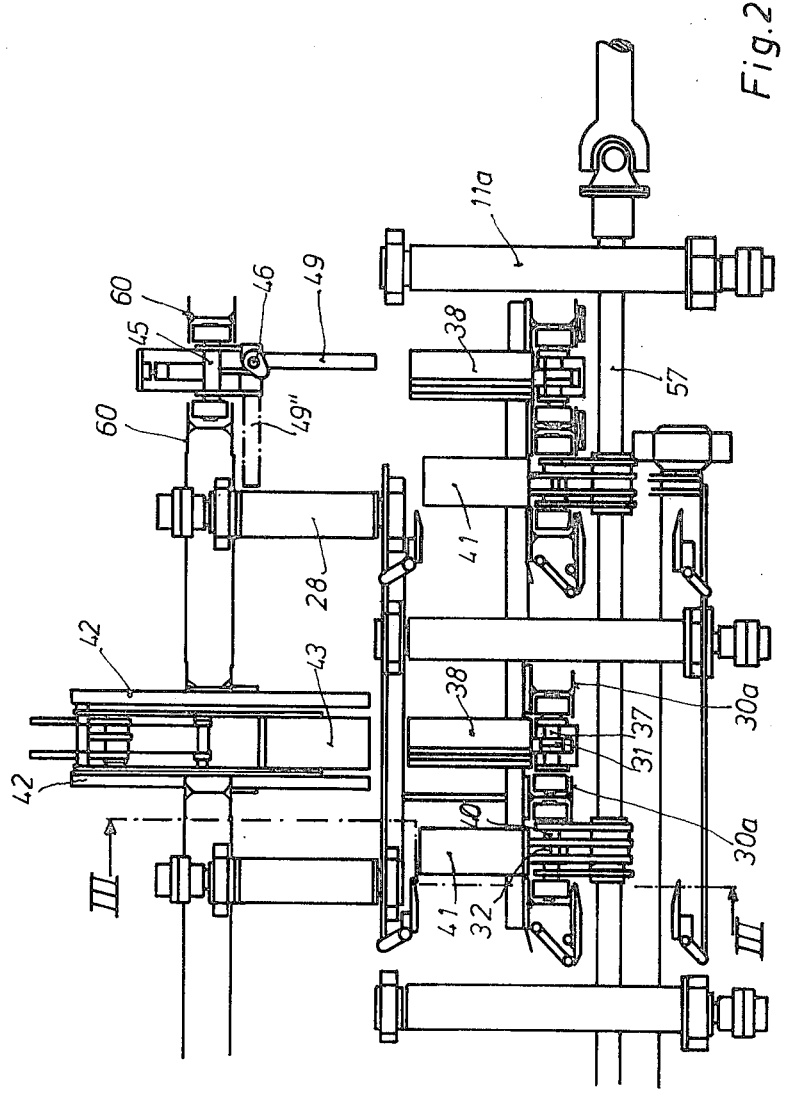

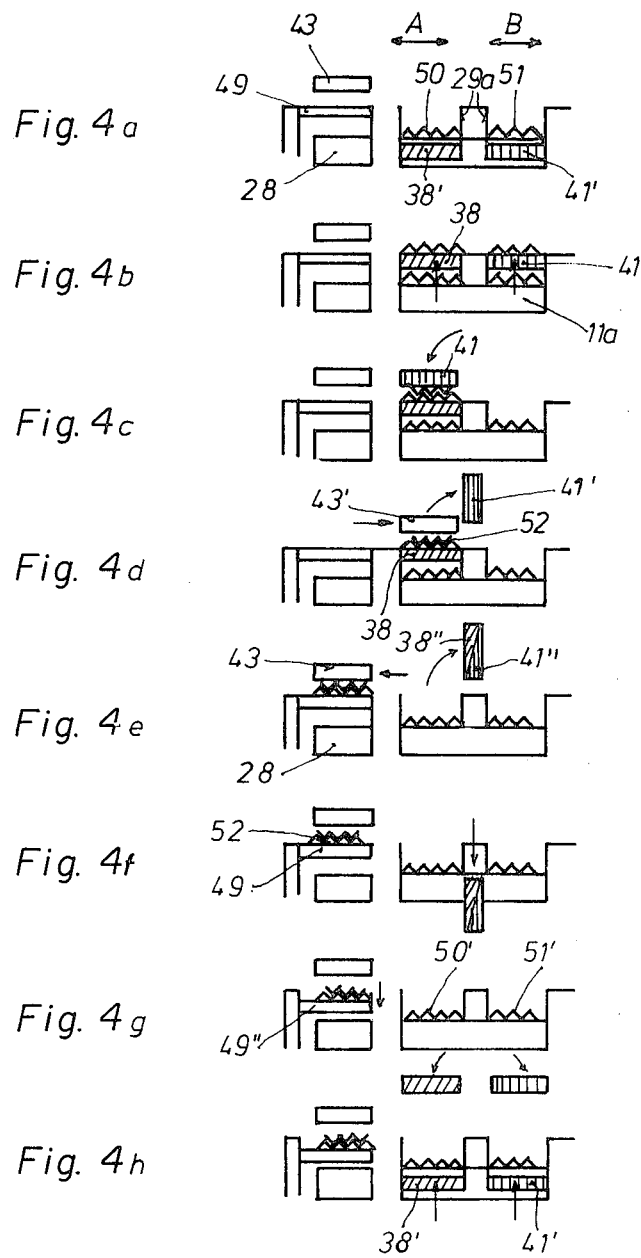

STACKING MACHINE FOR ROLLED BAR SHAPES

The invention relates to a stacking machine for the interlocking method of stacking rolled bar shapes on a stacking roller table on which the completed stack is discharged toward the next area, utilizing magnetic turnover arms for inversion of a partial group of n−1 bars onto a non-inverted partial group of n bars. Conventional stacking systems using turnover magnets require a cross transfer to pick up the bars at rest on a roller table, equipment for spatial separation of groups of rolled bars comprising n and n−1 bars, pass-over devices for transfer of partial groups of rolled bars onto the lowering stacking roller table in addition to turnover magnets to deposit partial groups of bars onto the succeeding non-inverted bar group (DE-PS No. 21 06 091 and DE-OS No. 24 09 284). Such transverse bar movement in known stacking systems interrupts natural material flow along the finishing line which, in turn, greatly increases space requirements and obscures the arrangement of the line. Furthermore, known stacking systems operate relatively slow, since new groups of bars cannot be advanced into position alongside the stacking system before the previous group is elevated and discharged from the elevating device and the device is returned to its initial position.

Therefore, the problem of avoiding transverse bar movement when stacking layers of rolled bar shapes has already been set (DE-OS No. 19 32 692). To solve this problem it is known that the stacking table or roller table is disposed to form an extension of a collecting device and that a distributing device, e.g. a swivelling tongue, is provided between the table and the collecting device to permit the stacking table or roller table and a by-pass roller table spaced parallel to the former table, to be alternately charged, in which case the groups of bars may be transposed from the by-pass table to the stacking table or roller table by means of turnover arms. However, such known stacking system solves the problem only in part, since the layers must still be formed on a cross transfer and the two roller tables, namely the stacking and the by-pass roller tables are charged one after the other by means of the distributing device or swivel tongue, i.e. in the case of angles alternately with groups of n and n−1 bars. Moreover, such procedure is time consuming.

Therefore, the object of the invention is to further develop a stacking machine for rolled bar shapes in such a manner that groups of bars, the number of which includes both partial bar groups of n bars and n−1 bars, may be entered into the stacking machine continuously and simultaneously and in close succession.

To begin with, the inventive stacking machine is equipped to form the two partial groups of bars at a difference of 1 from a group of 2n−1 bars during bar entry, in that the feed roller table is designed sufficiently broad and the partial groups of bars are separated by a wedge-shaped separating gib located ahead of the stacking machine and extending into the machine proper. In this manner, two partial roller table widths are formed inside the stacking machine, each being provided with a number of lifting and lowering braking skids for elevation of the partial groups of bars during bar movement. As these skids discharge their particular partial group of bars, they may be moved into their vertical swivel positions and, without intersecting the roller table level, may be returned to the elevating position below roller table level. After simultaneous elevation of the two partial bar groups in rhythm with the cooling bed bar discharge cycle, the next total group of bars may be entered into the stacking machine. The braking skids associated with the partial group of n−1 bars are designed for selective rotation through 90° (vertical position for the lowering motion) or 180° (for inversion of the partial group of n−1 bars). This will permit the partial group of n−1 bars suspended from the turnover magnets in their 180° positions, to come into a position above the partial group of n bars which have been elevated by the braking skids designed for rotation into the 90° vertical position only. The double layer of interlocked bar shapes formed in this manner is moved laterally to a position above the stacking roller table by receiving magnets which are controlled to move back and forth horizontally, where the stack is formed on stacking table arms as these arms index downwards.

The stacking table arms are further capable of rotating in the horizontal plane. After they deposit a completed stack of bars on the rollers of the stacking roller table, they may swing back into their initial positions above stack level and below the path of the horizontally movable receiving magnets without intersecting the stack of bars exiting on the roller table. Due to the fact that the lifting and lowering stacking table arms are returned to the upper working position before a completed stack has left the roller table, the table arms may receive the next double layer of bars in rhythm with the entry movement of the total group of bars into the stacking machine. Depending on the width of the feed roller table extending into the stacking machine, the inventive stacking machine is, thus, capable of stacking groups of a large number of bars during bar movement at an optimum speed rate. Apart from the inversion and transfer movements of double layers of bars into the area of the stacking roller table, stacking is accomplished without any transverse bar movement which is a significant space-saving aspect in the overall finishing line construction. Bar layer formation actually commences on the cooling bed.

An example of the inventive stacking machine and its arrangement in a continuous finishing line will now be described, with the aid of the drawings.

FIG. 2 is an enlarged partial plan view of the stacking machine.

FIGS. 4(a)–4(h) are a functional scheme of the stacking procedure.

Figure 1A:
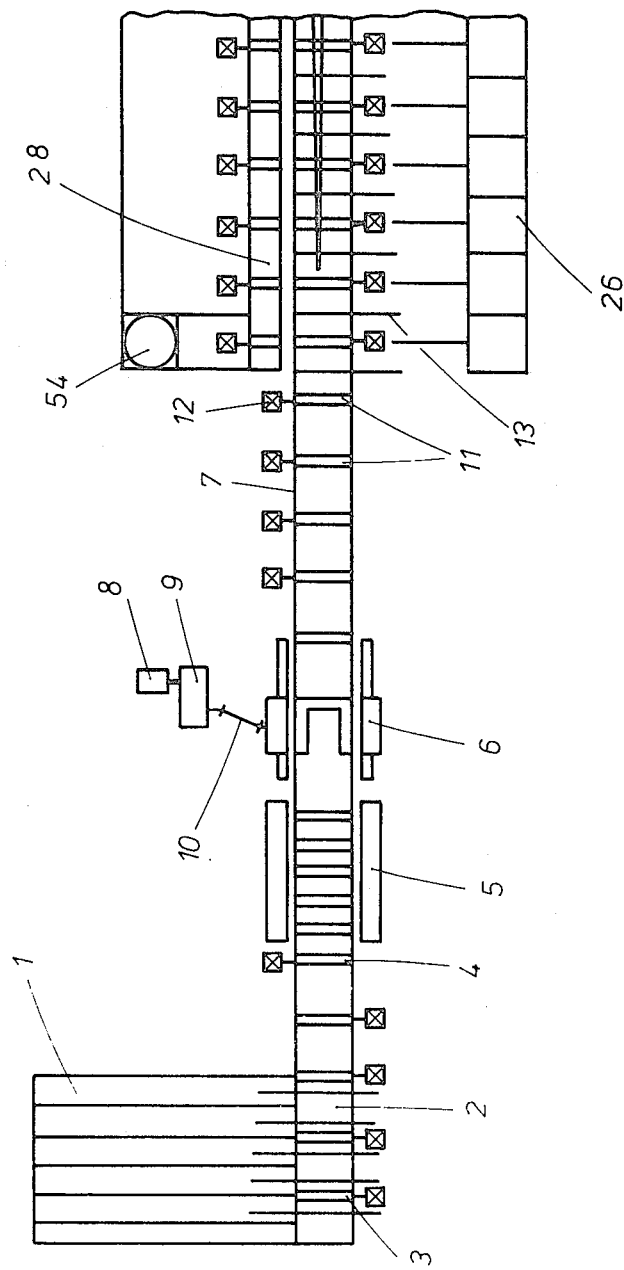
FIGS. 1a and 1b are plan views of the continuous finishing line following the cooling bed in the order of left to right.

The plan view in FIG. 1a shows the end of a cooling bed 1. Cooling bed lengths of cooled bars are passed onto a runout roller table 2 by a discharge device 3 in groups of uneven numbers of bars. Runout roller table 2 is followed by a pair of pinch rolls 4 and a multi-strand straightening machine 5. A continuous operation type flying shear 6 is located immediately downstream of the straightener 5 and may be moved back and forth in the direction of bar feed on a bed 7. The upper blade of the shear is driven by a motor 8 through a reduction gear unit 9 and a joint shaft 10.

The flying shear is followed by an approach roller table 11. Its drive, consisting of motors 12, is controlled to run at an advance speed higher than that of the drives of the pinch roll set 4 and the straightening machine 5. For instance, groups of bars advanced by the pinch rolls 4 and the straightener 5 at a speed of 1 m/sec may be accelerated to 1.5 m/sec to let these groups of commercial bar lengths sheared on flying shear 6 spread apart.

The approach roller table 11 is provided with a lifting and braking device 13 for extraction of groups of underlengths not fit for stacking from bar advance movement on the roller table. Such underlengths are collected in a collecting cradle 26. The approach roller table 11, designed to function as a lifting and braking device 13, is similar to a 'vibrating trough' to DE-AS No. 19 00 447, different only in that the slide type lifting and braking units are designed to handle groups of bars.

Figure 1B:
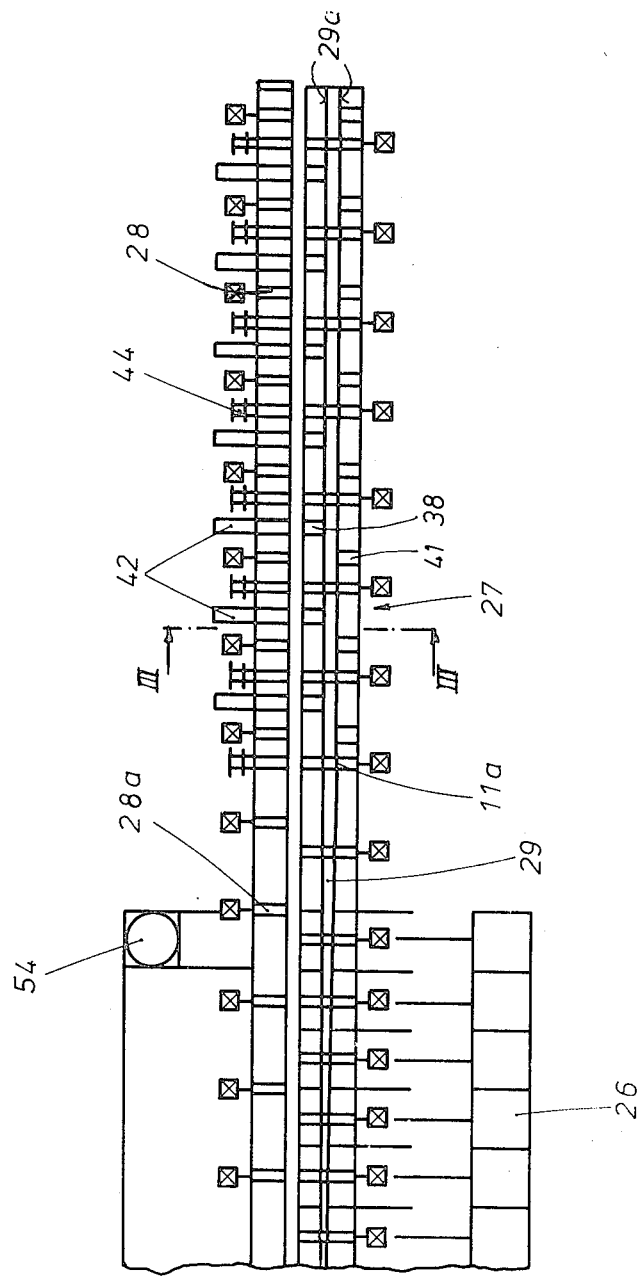

As shown in FIG. 1b, the approach roller table 11 also has the function of a feed roller table 11a for bar feed to the inventive stacking machine 27 and extends over the entire length of the stacking machine. A stacking roller table 28 is located alongside the approach roller table 11 and the feed roller table 11a, its area 28a extending upstream toward the cooling bed 1. A wedge-shaped separating gib 29 is provided along the length of feed roller table 11a preceding the stacking machine 27, i.e. in the area of approach roller table 11, the centerline of the gib being somewhat transposed within the width of the roller table for separation of a group of uneven number of bars $2n-1$ into two partial groups of n and $n-1$ bars. The length of separating gib 29 extending into the stacking machine down to the end of the feed roller table 11a comprises two separating walls 29a spaced in parallel, which may be sectionally interrupted. With regard to the wedge-shaped separating gib 29, the width of roller table 11 and 11a is required to be somewhat larger than the width engaged by the two partial groups totalling $2n-1$ bars.

Figure 3:
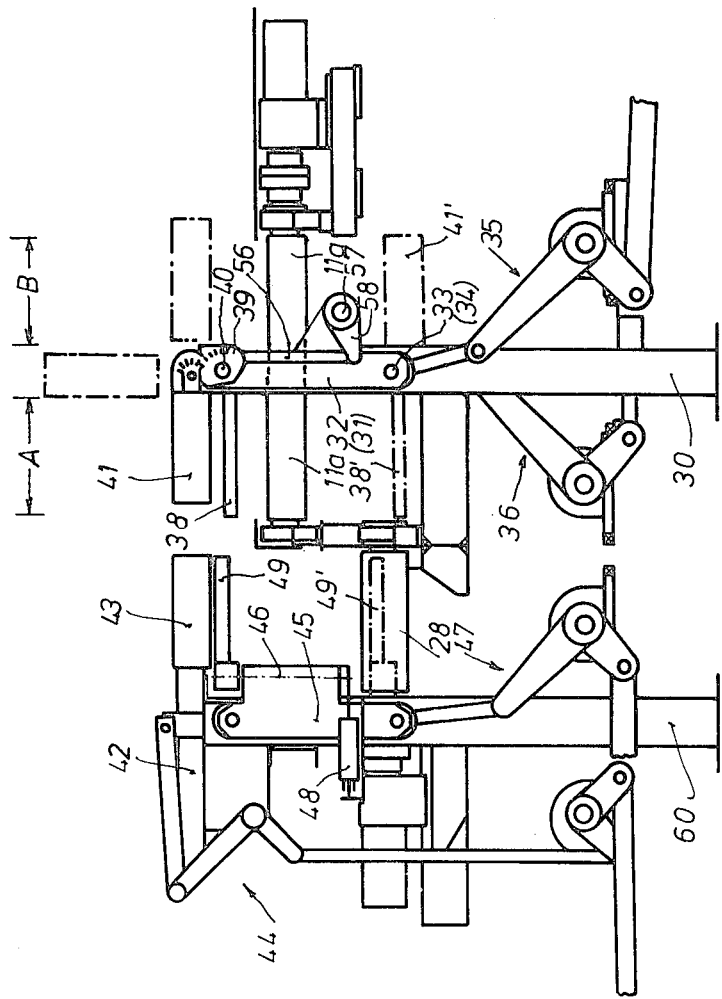
FIG. 3 is a cross section of the stacking machine through line III—III in FIG. 1b.

FIGS. 2 and 3 will explain the design and function of the stacking machine more closely. Within the plane of the separating walls 29a and over the length of the feed roller table 11a vertical guides 30 are provided in the form of pairs of channels 30a with legs directed toward one another to provide a passage. The vertical guides are to guide up and down movement of the push rods 31 and 32 which may either operate in groups or individually. Only the first push rod 32 of a groups or rods is visible in FIG. 3 within the section through line III—III in FIG. 2; push rods 31 of the second group of rods inside the aligned vertical guides 30 are concealed in FIG. 3. Separately controlled lifting and lowering drives 35 and 36 act on shafts 33 and 34 engaging into the lower ends of the push rods.

A braking skid 38 rotatable through 90° is keyed to a short swivel shaft 37 (FIG. 2) supported in the upper end of push rod 31. Swivel drives, not shown in the drawing, attached to the push rods and following the movement of the rods, are used for rotation of all braking skids 38 from their horizontal working positions to the vertical swivel position in which the braking skids 38 will be in alignment with the vertical guides 30. In FIG. 3, the braking skids are shown dash-dotted in the horizontal working position 38' below the level of the feed roller table 11a as well as in the elevated skid position 38 shown in solid line. The skids may be set still a trifle higher as will be described later on.

Each upper end of push rods 32 of the other group is also provided with a rotary shaft 40 (FIG. 2), with a rotatable braking skid 41 key-fitted to the shaft and directed toward the left in FIG. 3. The braking skids 41 are designed to function as turnover magnets and, by means of a gear wheel segment 39 acting on each rotary shaft 40, they may not only rotate into the 90° vertical position, but selectively through 180° to a position over the external partial width of the feed roller table 11a. The gear wheel segments 39 are driven by connecting rods 56 which may be shifted by a common shaft 57 supported on the push rods 32 through levers 58.

In FIG. 3, the turnover magnet braking skids 41 are shown in solid line in their uppermost positions, whilst the dash-dotted lower position 41' is that of braking skids 38'. Compared with the level of the feed roller table 11a, the position of braking skids 38' and 41' may appear to be extremely low, but results from the necessity that these skids must rotate back from the vertical into the horizontal position as their push rods lower, without intersecting the roller table level. Immediately they reach their lowermost positions, they will raise to a point just below roller table level (FIGS. 4a and h).

Approximately on level with the turnover magnet braking skids 41 in their uppermost horizontal swivel positions, horizontal guides 42 are provided beside the stacking roller table 28 for back and forth movement of receiving magnets 43 which may be controlled to move from their position above the stacking roller table to a position above the partial width A or the braking skids 38. Drives 44 are used for shifting movement of the receiving magnets 43.

Vertical U-shaped guides 60 (FIG. 2) are further provided externally beside the stacking roller table 28 to guide the up and down movement of push rods 45 which are also provided with runners similar to push rods 31 and 32. The push rods 45 are designed to guide vertical swivel shafts 46 which may be rotated by swivel drives 48. Horizontal stacking table arms 49 are keyed to the swivel shafts 46. With the aid of the swivel drives 48 and swivel shafts 46 these arms may be rotated through 90° between the upper working position shown in solid line, and the lower dash-dotted position 49' below the level of the stacking roller table 28 to return to their upper working positions without intersecting a completed stack of bars as the stack on roller table 28 is passed to the roller table area 28a (FIG. 1b). The push rods 45 are raised and lowered by drives 47.

The operational sequence of the stacking machine shown in FIGS. 2 and 3 may be more closely described with the aid of the functional scheme in FIG. 4.

It should be noted that the braking skids 38 are shown in slanting section lines and the turnover magnet braking skids 41 in vertical section lines in FIG. 4.

Cooling bed 1 discharges the cooling bed lengths of an uneven number of bars $2n-1$ onto the runout table. If the bars do not require straightening, the rolls of the multi-strand straightening machine 5 are opened up and the total group of bars is advanced solely by the pinch roll set 4 at a definite advance speed, the uniform flying motion of the shear 6 being set to suit this speed rate. Bars requiring straightening are advanced by the multi-strand straightening machine 5 at the appropriate straightening speed. The cooling bed lengths are sheared into commercial lengths on the flying shear and are then spaced apart by the effect of the accelerated advance speed of the approach roller table 11.

The wedge-shaped separating gib 29 in the area of the approach roller table 11 will separate the group of $2n-1$ bars to form two partial groups of bars 50 and 51 moving along side by side. In the example shown, the partial group 50 comprises $n=4$ bars and the partial group 51 has $n-1=3$ bars. The feed roller table is divided into two partial widths A and B by separating walls 29a extending into the area of the feed roller table 11a of the stacking machine 27. The bars to be stacked consist of angles in the example shown. Entry of the two partial groups of bars 50, 51 into the stacking machine 27 and the initial positions of the braking skids 38', the turnover magnet braking skids 41' and the receiving magnets 43 are illustrated in FIG. 4a.

Operation of the two lifting devices 35, 36 will elevate and brake the advancing bars and will simultaneously move the braking skids into the raised positions 38 and 41. As more clearly shown in FIG. 3, this will bring the turnover braking skids 41 to a level higher than that of skids 38. The elevating and braking step is shown in FIG. 4a and, while this step of operation is being performed, the next partial group of bars 50 and 51 may run onto the feed roller table 11a.

Inversion of the partial group 51 of 3 bars is shown in FIG. 4c. As the turnover magnet braking skids 41 rotate 180° by rotation of the common shaft 57 through a certain angle, the partial group 51 of 3 bars, now at rest, will come into position above the partial group 50 of 4 bars, also at rest, i.e. in the proper stacking order. The turnover magnets of the turnover braking skids 41 are deenergized to let the group of bars 51 drop into the three gaps of group 50 (FIG. 4d) and, at the same time, the receiving magnets 43 are advanced into position 43' over the roller table width A. Also at the same time, the turnover magnet braking skids 41, now clear of bars, will rotate into vertical position 41''. In this vertical position, the turnover braking skids 41 will be in alignment with the vertical push rod guides 30 and the separating gib 29 and may, therefore, be lowered between the next partial groups of bars 50, 51 during entry movement of these bars.

The double layer of bars 52 resting on braking skids 38 in FIG. 4d are forced against the overhead receiving magnets 43' by means of a short overstroke through the drives 36. The magnets 43' are then returned to position 43 over the stacking roller table 28 as shown in FIG. 4e. The braking skids 38, now clear of the double layer of bars 52, also rotate into the vertical position 38'' to align with the turnover magnet braking skids 41''. To indicate the aligned position of the two different types of braking skids, the section lines in FIG. 4e and f are shown in diagonal arrangement.

At this stage, shown in FIG. 4f, the double layer of bars 52 will be resting on the elevated stacking table arms 49 and, at the same time, the aligning braking skids 38 and 41 will have lowered (FIG. 4g) without intersecting the roller table level or the path of the next partial groups of bars 50' and 51', to a point at which they may rotate into the horizontal working position and elevate into starting position (FIG. 4h). The stacking table arms 49 will then lower by a partial stroke into position 49'' to take the next double layer of bars 52. The stacking cycle is recommenced in accordance with FIG. 4a.

In their spaced arrangement behind the flying shear 6, the partial groups of bars 50 and 51 will enter the feed roller table 11a at a speed of about 1.5 to 2 m/sec, which will allow the bars to come to rest relatively fast. At most, only the first few braking skids 38 and 41 need be offset to prevent the bars from striking. Bar group sequence inside the stacking machine 27 corresponds with the sequence at which the total groups of bars are passed from the cooling bed 1 to the runout table 2.

With the inventive stacking machine 27 which permits formation of partial groups of bars 50 and 51 side by side, and simultaneous elevation, braking and stacking of the bars within the bar group sequence, application of the continuous principle over the entire finishing line has become a reality. It should be understood, however, that stops may also be used for stopping down the partial groups of bars 50, 51 within the operational sequence.

Although the inventive stacking machine 27 has been designed for inversion of small to medium sized rolled bar shapes, it is also adaptable to round bars. Rounds are sheared and are passed to the feed roller table 11a by means not shown, but are limited to the partial width A on the roller table. They are braked by the upward movement of the braking skids 38 and picked up by the receiving magnets 43 in the manner described for lateral movement over the stacking roller table 28. The stacking table arms 49 are maintained in their ineffective positions 49' and the rounds suspended from the receiving magnets are simply dropped into the stacking cradles of the stacking roller table 28.

Each charge of bars dropping down as the receiving magnets 43 de-energize are aligned with the aid of a plate (not shown) which may be forced against the ends of the bars and which is located at the end of the stacking roller table 28. Each completed stack is moved rearwards into roller table area 28a for strapping on a movable strapping machine 54. It is then discharged by crane. Such rear location has been selected to give account to space problems. Certainly, the stack may also be moved in the opposite direction.

In the event of interferences at the stacking machine 27 or whenever underlengths arrive, the total groups of bars are elevated from the approach roller table 11 and braked by the elevating and braking device 13 for discharge into the stacking cradles 26. It should be noted that the elevating and braking means of the device 13 are required to reach through openings in the wedge-shaped separating gib 29.

What is claimed is:

1. A stacking machine for the interlocking method of stacking rolled bar shapes on a stacking roller table on which a completed stack is discharged toward the next area, utilizing rotatable magnetic turnover arms for inversion of a partial group of n−1 bars onto a non-inverted partial group of n bars, characterized by
    (a) a feed roller table (11a), the width of which is larger than that of the two partial groups of 2n−1 bars,
    (b) a wedge-shaped separating gib (29) extending over the length of the feed roller table portion ahead of the stacking machine (27), for separation of a group of 2n−1 bars into two partial groups of bars (50, 51), continued down to the end of the feed roller table by two separating walls (29a) spaced in parallel relationship,
    (c) vertical guides (30) disposed between the separating walls (29a) over the length of the feed roller table, to guide up and down movement of two groups of push rods (31, 32) in which either said push rods may operate in said groups or said groups may operate commonly,
    (d) swivel shafts (37, 40) supported on the upper ends of the push rods of each group, with swivel drives for rotatable braking skids (38, 41) connected to the swivel shafts for elevation of the partial groups of bars from the roller table in the horizontal position of the braking skids which extend in groups left and right over the partial widths of the feed roller table and which may rotate into the vertical position subsequent to an upward stroke, in which they may move downward in simultaneous alignment with the vertical guides (30) of the push rods, to a point from which they may rotate back into the horizontal working position without intersecting the roller table level, (e) the design of the braking skids which, in their horizontal working positions, extend over the partial width (B) of the feed roller table for the partial groups (51) of $n-1$ bars, to function as turnover magnets (41) which may be rotated selectively through 90° or 180°, (f) horizontal guides (42) approximately on level with the turnover magnet braking skids (41) in their uppermost horizontal swivel positions, provided to guide back and forth movement of receiving magnets (43) which move double layers of bars (52) suspended therefrom from their position on the roller table partial width (A) for partial groups (50) of n bars to a position over the stacking roller table (28) located beside the feed roller table, (g) vertical guides (60) disposed externally beside the stacking roller table for up and down movement of push rods (45) which support vertical swivel shafts (46) and swivel drives (48), the swivel shafts being connected to stacking table arms (49) which may move back and forth horizontally to receive double layers of bars (52) and which may swivel back into their receiving positions above the stack of bars exiting on the stacking roller table and below the level of the horizontally supported receiving magnets (43) without intersecting the stack.

2. A stacking machine according to claim 1, characterized in that rotating or swivel drives for swivel shafts (37, 46) are supported on push rods (31, 45) to move along with the rods.

* * * * *